US012802201B2

(12) United States Patent
Dürr et al.

(10) Patent No.: US 12,802,201 B2
(45) Date of Patent: Nov. 17, 2026

(54) METHOD FOR INSPECTING A CORRECT EXECUTION OF A PROCESSING STEP OF COMPONENTS, IN PARTICULAR A WIRING HARNESS, DATA STRUCTURE, AND SYSTEM

(71) Applicant: Siemens Industry Software Inc., Plano, TX (US)

(72) Inventors: Matthias Dürr, Nuremburg (DE); Pavel Nosek, Plzeň (CZ); Marlene Kuhn, Nuremberg (DE); Huong Giang Nguyen, Nuremberg (DE)

(73) Assignee: Siemens Industry Software Inc., Plano, TX (US)

( * ) Notice: Subject to any disclaimer, the term of this patent is extended or adjusted under 35 U.S.C. 154(b) by 405 days.

(21) Appl. No.: 18/266,032

(22) PCT Filed: Dec. 9, 2020

(86) PCT No.: PCT/EP2020/085270

§ 371 (c)(1),
(2) Date: Jun. 8, 2023

(87) PCT Pub. No.: WO2022/122149

PCT Pub. Date: Jun. 16, 2022

(65) Prior Publication Data

US 2024/0029234 A1 Jan. 25, 2024

(51) Int. Cl.

*G01M 17/00* (2006.01)
*G06T 7/00* (2017.01)

(52) U.S. Cl.

CPC .. *G06T 7/0008* (2013.01); *G06T 2207/30108* (2013.01); *G06T 2207/30204* (2013.01)

(58) Field of Classification Search

CPC ......... G06T 7/0008; G06T 2207/30108; G06T 2207/30204; G01M 17/00; H01B 7/365; H01B 13/01209; Y02P 90/02
See application file for complete search history.

(56) References Cited

U.S. PATENT DOCUMENTS

2005/0004774 A1 1/2005 Volk et al.
2010/0188244 A1 7/2010 Sattler et al.
2011/0234788 A1 9/2011 Koike et al.

FOREIGN PATENT DOCUMENTS

CA 3090591 A1 * 8/2019 .............. G06F 3/011
CN 1846170 A 10/2006

(Continued)

OTHER PUBLICATIONS

GS1, GS1 DataMatrix Guideline, https://www.gs1.org/docs/barcodes/GS1_DataMatrix_Guideline.pdf, Jan. 2018 (Year: 2018).*

(Continued)

*Primary Examiner* — Vu Le
*Assistant Examiner* — Lei Zhao
(74) *Attorney, Agent, or Firm* — Lempia Summerfield Katz LLC

(57) ABSTRACT

The described method as a key enabler for Optical Inspection dynamically uses individual marks like fiducials, barcodes, data matrix codes ("markers") in the scenes, beyond their basic presence, meaning the change of situation between a first processing status and a subsequent processing status in the processing station. The same markers are simultaneously used for: the identification of components ("comp"); the identification of locations ("loc"); the definition of dependencies between identity and location (valid, invalid); and the automated detection and evaluation of the dependencies.

17 Claims, 5 Drawing Sheets

(56) References Cited

FOREIGN PATENT DOCUMENTS

| | | | | | |
|---|---|---|---|---|---|
| CN | 102207370 | A | | 10/2011 | |
| CN | 111582274 | A | * | 8/2020 | ........... G06V 10/245 |
| DE | 102004011327 | B3 | * | 11/2005 | ......... H05K 13/0815 |
| DE | 102016123976 | B3 | | 6/2018 | |
| EP | 3142128 | A1 | * | 3/2017 | ....... H01B 13/01227 |
| JP | 2001027518 | A | | 1/2001 | |
| JP | 2007333399 | A | | 12/2007 | |
| JP | 2010249744 | A | | 11/2010 | |
| JP | 2016070710 | A | * | 5/2016 | |
| JP | 2016223869 | A | | 12/2016 | |
| JP | 2018084542 | A | | 5/2018 | |
| WO | 2005092568 | A1 | | 10/2005 | |

OTHER PUBLICATIONS

PCT International Search Report and Written Opinion of International Searching Authority mailed Sep. 13, 2021 corresponding to PCT International Application No. PCT/EP2020/085270.

* cited by examiner

METHOD FOR INSPECTING A CORRECT EXECUTION OF A PROCESSING STEP OF COMPONENTS, IN PARTICULAR A WIRING HARNESS, DATA STRUCTURE, AND SYSTEM

The present patent document is a § 371 nationalization of PCT Application Serial No. PCT/EP2020/085270, filed Dec. 9, 2020, designating the United States, which is hereby incorporated by reference.

TECHNICAL FIELD

The present disclosure relates to methods and systems for inspecting wiring harness states between individual working stations in an automated way.

BACKGROUND

Modern automobiles are now becoming more like computer on wheels. A large number of signals (from the automobile's own sensors or from the environment like other automobiles or traffic signs or the like) are constantly processed and returned to the vehicle in the form of control commands. A prerequisite for this is the correct use of cabling of the individual modules, sensors, and actuators, which has become an increasing challenge for automotive production in recent years.

The result is an individually designed wiring harness for more or less each vehicle.

An automotive wiring harness composes of a variety of components, such as standardized and special wires, connectors, clips and fixing elements, tubes, tape, cable channels, connector terminals, grommets, etc. The manufacturing of the wiring harness is inflicted by a high degree of complexity. Each wiring harness is customized to customer orders and therefore a unique product. This results in a vast number of wiring harness product configurations, which have varying structured bills of material and require different sequence of production steps and tasks in the manufacturing.

The complexity for wiring harness manufacturing not only stems from the product variety, but also from the highly manual work required to produce a wiring harness. Accordingly, the production of a wiring harness is characterized by a high degree of manual labor, especially in the final assembly area of wiring harnesses. In the final assembly, operators manually add components and pre-manufactured subassemblies to a wiring harness so called formboard assembly station.

By performing additional manual tasks such as routing wires, insertion of wires into cavities of connectors, taping wires to achieve wire bundles, and so on, the final product, a wiring harness, is produced. Due to up to 90% manual work, failures occur. Human labor may result in random instead of systematic failures and is not as consistent and reproducible as automated processes. This results further in the necessity for a high amount of testing.

Testing uses also the principle of Optical Inspection, which provides a powerful, but in itself complex means. This is due to complex engineering, which makes it hard to adapt it to changing products, and a high sensitivity with regard to environmental and other influences as light and shadows, variation in component properties, etc. These are key problems and reasons why this powerful tool is today only rarely used in the field of wire harness manufacturing.

There are already a lot of patent applications published, addressing the wiring harness industry and proposing optical inspection concepts. The following list shows a selection of already known solutions:

In JP2001027518 A, a visual inspection system is proposed based on a so-called pan-tilt camera. That means, the camera is positioned in a predefined location but may capture a wide region of interest by moving along its axis. The camera takes an image of inspection object parts and automatically assesses the quality of the object as good or bad. Whenever a defect is detected, the defect location is indicated with a laser light beam.

JP002010249744A describes a system including a moving camera that captures multiple images along the vertical and horizontal dimension of the formboard. Afterward, the images are stitched together.

From JP002016070710A, a moving camera takes images along a predefined path to determine whether the wiring harness passes or fails visual inspection.

Also, in DE102016123976B3, a camera is already known from the state of the art, that is mounted on a robot arm. The robot arm moves to multiple monitoring zones to compare the current state of the wiring harness with a target status. If a deviation is detected, it will be shown on a display and corrected by tools and a manipulator.

There are further patents and applications addressing the inspection of specific locations or components of the wiring harness. In JP2007333399A, for example, an inspection of the wiring harness components is performed which are held in a holding member. Therefore, the holding member is labeled with an identification mark as a reference point for image capturing. The image is processed to assess whether the objects seen on the image comply or deviate from predefined requirements.

JP2016223869A focuses on the detection of tubes by binarizing the image data and a threshold for brightness.

JP002018084542A presents an optical inspection solution to detect holding devices in a predefined region and to determine whether the holding device is part of the wiring harness.

EP 3142128 A1 also describes a method of inspecting a wire harness, by reading connector identification information attached to a connector and connector identification information displayed on a connector image, comparing the reading connector identification information and the connector identification information with each other.

A lot of effort has been put into image acquisition, recognition of objects, and the setup of "stages" for the presentation of the object to a camera like gimbals, robots, gantries, and the like.

To illustrate the situation more clearly, the following briefly describes a system according to the state-of-the-art, which provides a starting point for the disclosure described herein. An exemplary state of the art application machine with a vision system is depicted in FIG. 5.

The optical inspection system includes a camera 54 for grayscale images, a wiring harness that is mounted on a formboard 53, and a data processing pipeline to process the image data. The goal of the system is the detection, classification, and quality assessment of wiring harness components.

The common use of markers 55 addresses components that look-alike and are partially occluded either by other components due to the geometry of the wiring harness or by the connector holder. For the wiring harness, especially connectors 11, are similar-looking components and may be occluded by connector holders. Accordingly, connectors 11 look alike from the outside regarding color and shape but have a different number of cavities.

Furthermore, they require big connector holders that may hold them on the formboard. For occluded and look-alike components like connectors, feature detection does not perform as reliable because the features are not distinct across components. To solve this problem, more unambiguous and visible features in form of data matrix codes 55 are added. The traditional way to apply machine vision to markers is their attachment to components.

In the state of the art, if the optical inspection of this scene had to be modelled, models of all the components and the holder had to be generated and trained in advance, the smallest of changes would mean a repetition of a training process starting and based on the training data 51 and the trigger data 52 in the PCS, MES, or the like data storage, where the combination of the information comes to Detection Results and are played back into the data base 52.

SUMMARY AND DESCRIPTION

It is the task of the disclosure to provide a solution to the problems described above. Proposed methods, data structures, and systems are provided to perform an optical inspection of wiring harness states between individual working stations in an automated way.

The scope of the present disclosure is defined solely by the appended claims and is not affected to any degree by the statements within this summary. The present embodiments may obviate one or more of the drawbacks or limitations in the related art.

It is one basic issue of the disclosure that a key enabler for Optical Inspection has not received attention yet: the dynamic use of individual marks like fiducials, barcodes, data matrix codes ("markers") in the scenes, beyond their basic presence, meaning the change of situation between a first processing status and a subsequent processing status in the processing station.

The disclosure is defined by the use of the same markers simultaneously for: a) the identification of components ("comp"); b) the identification of locations ("loc"); c) the definition of dependencies between identity and location (valid, invalid); and d) the automated detection and evaluation of the dependencies.

This is explained in more detail later on the basis of FIG. 2.

The disclosure is characterized by the fact that it uses a dynamic understanding of the implementation of discovery of markers during time, e.g., to make use of the change of visibility of the markers before and after a processing step and the spatial changes of the manufacturing situation.

BRIEF DESCRIPTION OF THE DRAWINGS

The disclosure is represented by the accompanying figures, whereby the figures show as follows.

DETAILED DESCRIPTION

Figure 1:
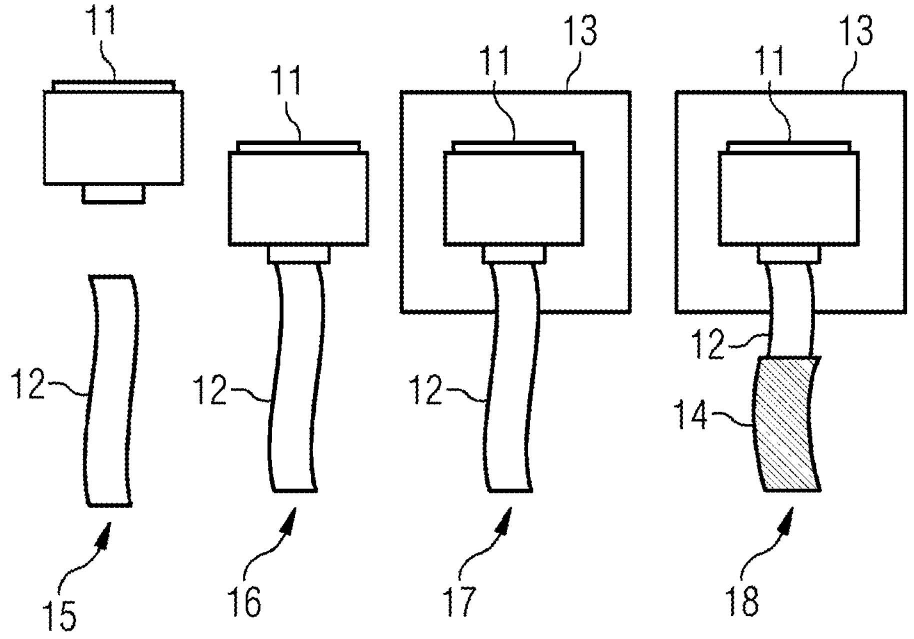
FIG. 1 depicts examples of elements and states of a wiring connection during manufacturing.

FIG. 1 shows an example of a sequence in the manufacturing of a wiring connection, used in the processing of a wiring harness, the example not having a restrictive effect on the disclosure. In act 15, a bundle of cables 12 is attached to a connector 11. In the next act, the workpiece 16 is taken to fix the connector 11 in a holder 13, 17. In act 18, the bundle of cables 12 is fixed with a tape 14.

Figure 5:
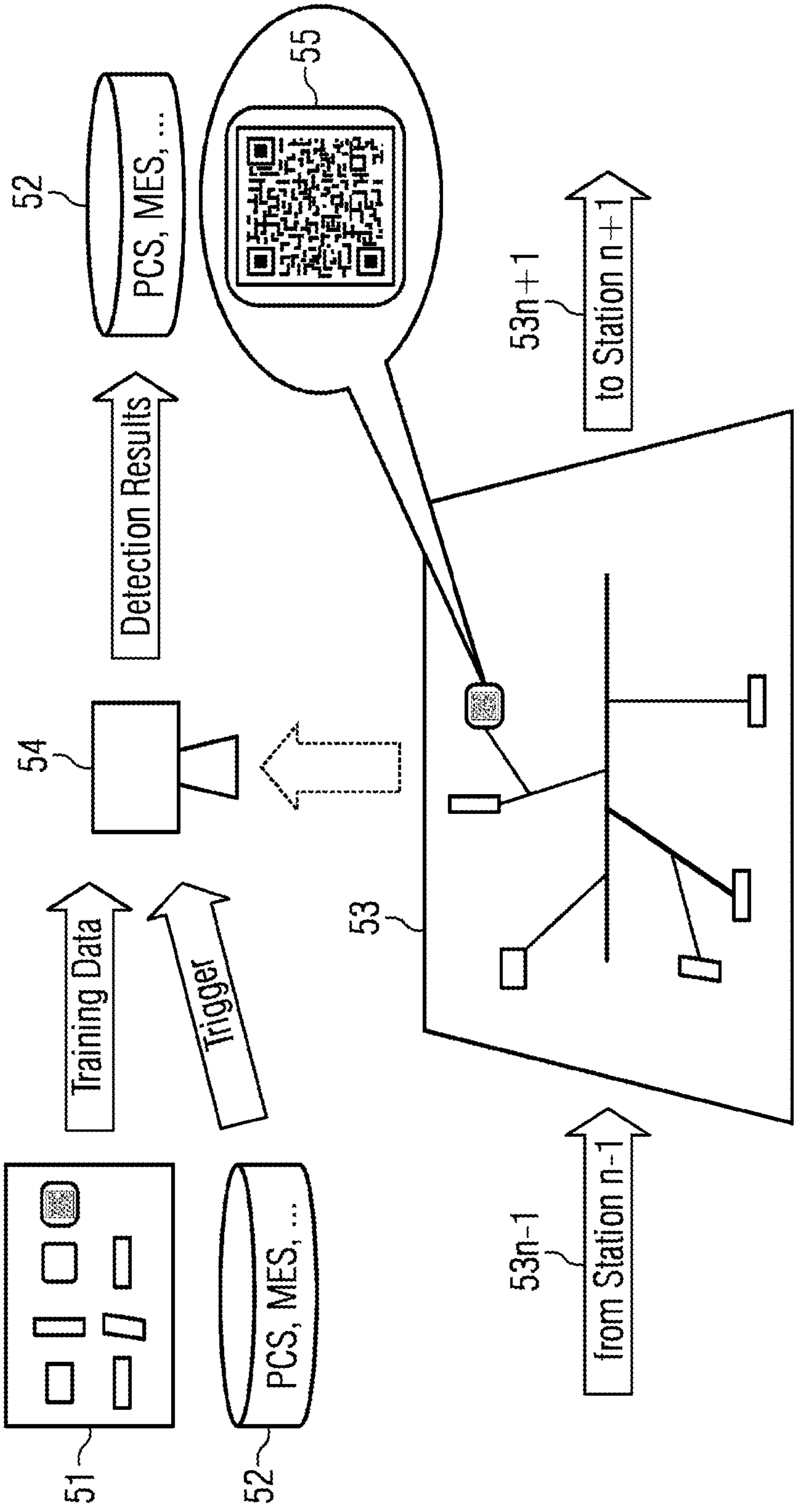
FIG 5 PRIOR ART
FIG. 5 depicts a known application of a machine vision system in wire harness manufacturing (e.g., a final assembly station).

In the state of the art, like shown in FIG. 5, if the optical inspection of this scene had to be modelled, models of all the components and the holder had to be generated (e. g. for PCS, MES, . . . ) and the recognition of the components via the optical sensor (camera) 54 will be trained in advance, meaning that the smallest of changes would as a consequence lead to a repetition of the training process.

The use of markers would simplify this process inasmuch, as minor changes to the appearance of the components may be ignored (also possibly caused by different light or shadow), as long as the marker is visible.

Figure 2:
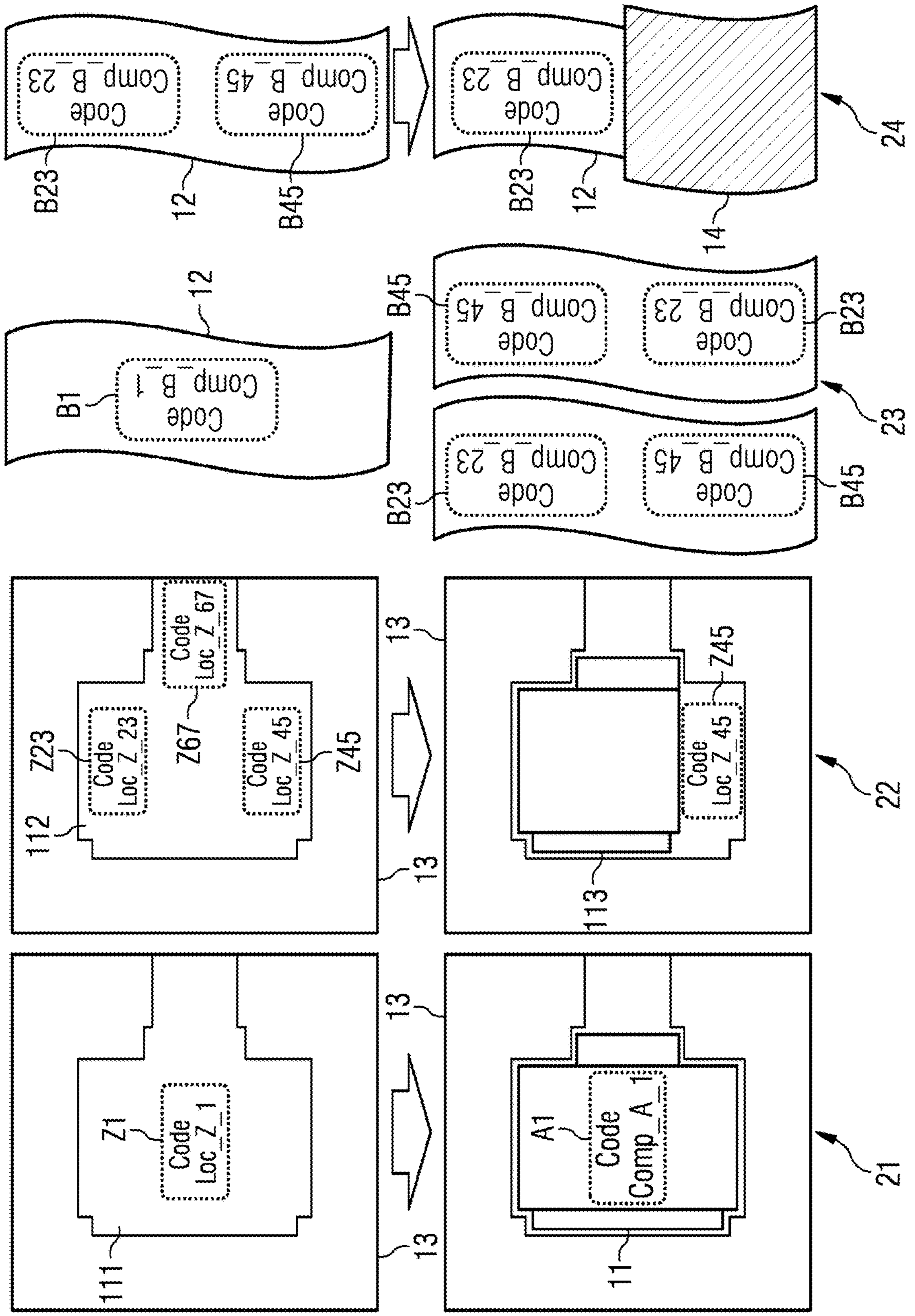
FIG. 2 depicts an example for the use of markers.

As previously mentioned, FIG. 2 provides examples for the use of markers.

These are only exemplary scenarios, that means all examples of markers, especially the used terms are only for exemplary means and do not restrict the disclosure.

"Covering Location with Component" 21

The example shows in the top the view of an empty holder 13, with a space 111 designed to accommodate a connector 11, with a marker Z1 within this empty space, for its location (Marker "Code Loc_Z_1"). Once a connector 11 is inserted in the space 111 of the holder 13, like in the lower left corner, 21, the location code Z1 is no longer visible but in its place the code A1 (Marker "Code Comp_A_1") of the component 11. This permits to check, e. g., if all empty holders have been filled in processing step, and if they have been filled correctly, that means with the correct component.

"Wrong Connector in Holder" 22

The next example shows on top an empty holder 13, with a space 112 designed to accommodate a connector 11. Several (sub-)locations Z23 (with Marker "Loc_Z_23"), Z45 ("Loc_Z_45") and Z67 ("Loc_Z_67") have been indicated. Once a wrong or misaligned connector 113 is inserted (on the bottom of 22) there are still some of the markings visible, in this example it is Z45 Loc_Z_45. This permits to recognize an error and even to some extent to characterize the nature of the error.

"Identification of Wire Orientation" 23

The next example shows on top a wire 12 with a single marker B1 ("Comp_B_1") providing of an identification; the use of two markers (bottom) ("Comp_B_23") B23, and ("Comp_B_45") B45 provides additional information about the wires' orientation, if needed (marker "a" above "b").

"Correct Extent of Taping" 24

The last example 24 of FIG. 2 on the right side shows another use of markers on the wire 12, the possibility to determine if the taping 14 (also: foaming in, shrink wrap, . . . ) has been applied to the right extent as marker B45 has been made "invisible" by the covering material, and marker B23 is still visible.

With the aforementioned examples, the use of markers to identify empty locations is advantageous in various manufacturing steps (e.g., for storage, transport, fixture for impending operations, assembly, etc.), thus defining the "key topology" for the manufacturing process.

Additionally, the use of markers is used not only for the identification of components but also for the determination of their orientation.

Further, the use of markers determines the fulfillment of given process specifications (e. g. extent of tape coverage) in the processing step.

Also, rules are used that are corresponding with process steps, e.g., upon arrival at the station, all holders have to be empty (all holder's location labels are visible), or upon departure from the station, all holders are correctly filled (predefined holders' labels are not visible)).

Figure 3:
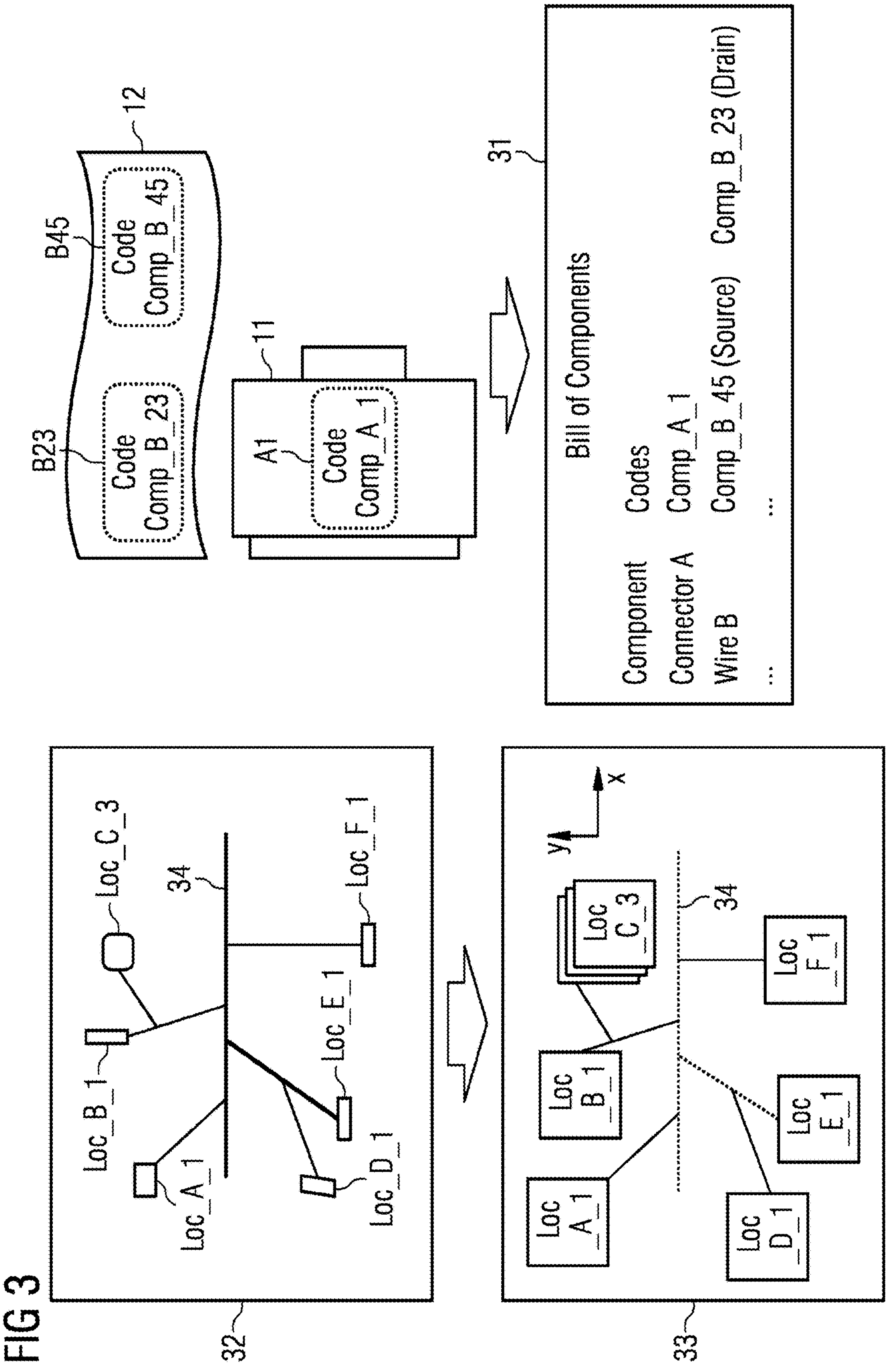
FIG. 3 depicts an example of use of a topology map.
Figure 4:
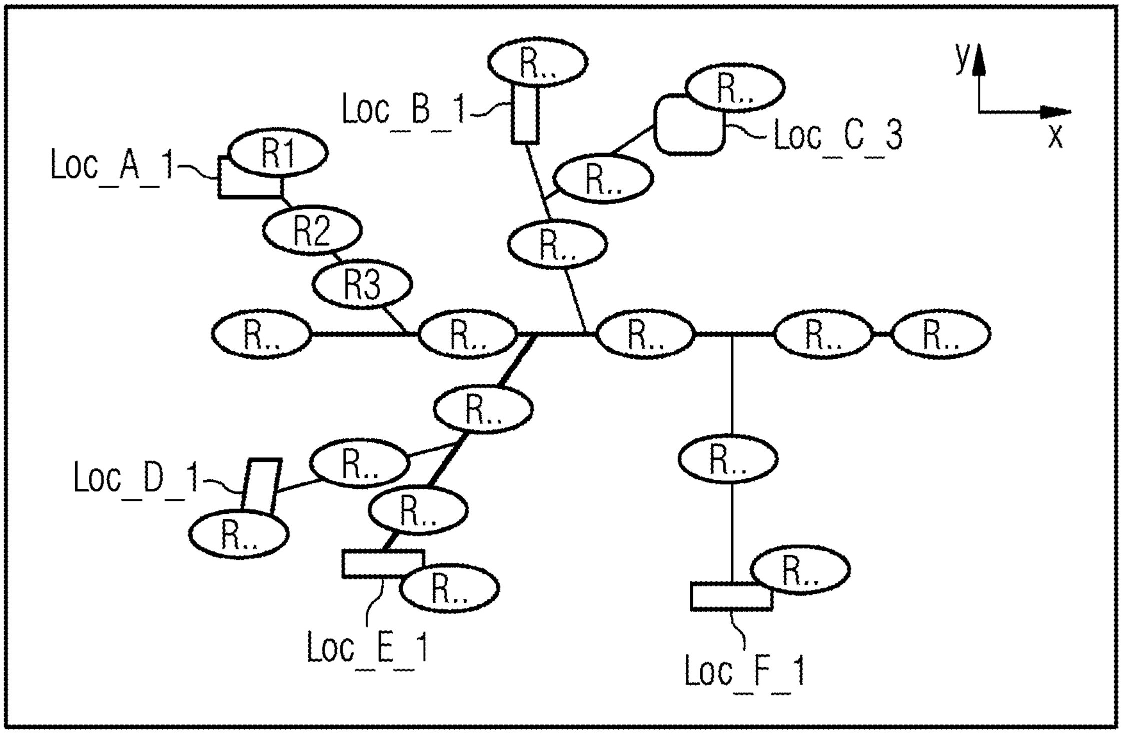
FIG. 4 depicts an example of a map of inspections for a particular point in time.

Further, the following elements are proposed, like depicted in FIGS. 3 and 4.

Within FIGS. 3 and 4, a Topology Map 33 indicates all technically meaningful locations for the processing on the formboard. A Bill of Components 31 lists all relevant parts needed for the manufacturing (of the Wire Harness). A List of Rules R1, R2, . . . , defines the dependencies between components, locations and manufacturing process effects. A Map of Inspections (shown in FIG. 4) shows on which locations the aforementioned rules R1, R2, . . . have to be applied.

FIG. 4 shows the Map of Inspections for a particular point in time in the manufacturing process; e.g., for use after completion of final assembly where every rule R1, R2, R . . . is to be applied in the respective location Loc_A_1, Loc_B_1 . . . .

In the following, there is shown an exemplary List of Rules R1, R2, R3, . . . , defining exemplary evaluation rules:

| Rule ID | Issue | Location | Component | Transition | Mfg Process | Effect | Rule |
|---|---|---|---|---|---|---|---|
| R1 | Component inserted in holder | L1 on formboard | Ca (Cable) | Insertion process | Component inserted in holder | Code L1 covered by Code Ca_.. | Good = code L1_.. invisible, code Ca_.. visible in its place Bad = code L1_.. still or in part visible |
| R2 | Wire orientation | codes Ca_x and Ca_y on wire | Ca | Wire positioning process | Wire positioned on holders | correct position in relation to code Ca_y | Good = Ca_x in correct position relative to Ca_y Bad = Ca_x in reverse (or unexpected) position relative to Ca_y |
| R3 | Extent of taping | positions of codes Ca_x and Ca_y on wire | Ca | Taping (foaming in, shrink wrapping, ..) | Wires covered by protective shell | Covered code is no longer visible | Good = code in position to be covered becomes invisible Bad = code in position to be covered remains visible |

The map of inspections from FIG. 4 may be derived from the topology map, which then is complemented with the rules for the visual inspection that shall be executed at the respective locations. For each assembly process step, predefined rules are defined and will be checked, to monitor the assembly state of the wiring harness.

The following symbolic algorithm describes the execution in both the process engineering and the process execution.

```
--------------
Marker-based optical inspection algorithm
Algorithm for automated optical inspection based on dynamic
marker positioning in wiring harness assembly line
```

-continued

```
During wiring harness development
  Initialize rule IDs Ry = {Ia, Cb, Lc, Ed} with y, a, b, c, d ∈ℝ
    Describing the optical inspection issue I
    The numerical information of marker on component C,
    The numerical information on marker at location L,
    And the effect E as the relation between location and component
  Initialize assembly line working station WSx with X ∈ℝ
  Assign relevant rule IDs Rt ⊆ Ry to WSx = {Rt} with t ∈ℝ
During Manufacturing
  For WSx
    Take image with binary information after assembly task
    Image processing by camera to identify markers and read numerical
    information on markers
    Checking of actual and target state by MES
      If assigned rules WSx = {Rt ⊆ Ry} comply with numerical
      information provided by camera
        Then quality OK and WS x+1
        Else quality NOK, visualization of failure and rework
      Endif
  Endfor
--------------------
```

In the following, a further application example for the application and detection of codes in wire harness manufacturing is provided.

The system is based on two different inspection programs. For fully visible components on the image, the inspection program relies on component modeling, whereas, for partially visible and similar components, data matrix codes are used.

The first inspection program addresses wiring harness components that possess distinct features and therefore, may be differentiated visibly. Examples for such components are different types of clips, foamed parts, and relay boxes.

For the detection of these components, virtual component models are created. The models contain component-specific information such as edges and component color. Creating models and choosing relevant features for the models, also referred to as feature engineering, is conducted for each component, which should be optically inspected in wiring harness manufacturing.

In the manufacturing, the models are the foundation for object detection and quality assessment. The camera captures an image, and the image data processing pipeline starts.

For each model, the image is scanned for objects that are similar to the models. However, the objects do not have to be of the same size and orientation because the data processing algorithm may consider scaling and full rotation of the object.

If a critical threshold is passed, which means if enough found features align with the model, the found object is marked with a bounding box on the image. The rotation of the found object in relation to the model is given in degrees and the location of the bounding box in relation to the bottom left corner as the coordinate origin is given in x and y coordinates. There is a final visualization of what kind of objects were found, the location and rotation of each object, and the number of each component in the image.

In one advantageous embodiment, the data matrix code applied are according to ECC 200 (ISO/IEC 16022:2006). In the example shown, the data matrix code is positioned into the connector holders as well as on the connectors. Due to lack of space in the component holders, the data matrix codes have a size of 10 columns and 10 rows. Accordingly, the codes may contain numerical information from 0 to 255. The advantage of data matrix code is that the information on them is condensed and they may be read even if they are partially damaged. Instead of detecting the object straight, the camera detects the data matrix code and provides the information that the code contains.

The information of the data matrix code positioned in the connector holder is used to derive the existence of a connector in a connector holder.

The information of the data matrix code on the connector is used to identify and classify the mounted connector and to assess its position on the formboard.

In the industrial implementation, the camera captures an image and scans the image for data matrix codes. When data matrix codes are detected, the final visualization shows codes found in form of numbers.

To enable both inspection programs, especially the second approach, data specification and data preprocessing during the development process is important.

During wiring harness design, once components are chosen, models of the objects are established for the first inspection program. If the second approach is chosen, data matrix codes are specified by designers during formboard design. Accordingly, data matrix code codes are generated and placed into connector holders in the formboard design.

It is important that each formboard contains unequivocal data matrix codes and is not labeled with the data matrix codes with the same information twice.

The information the data matrix code contains is paired with the component, that should be placed into the connector holder, e.g., connector type 123 is associated with the data matrix code 006 in the connector holder that is positioned at the location (245|329) or, like shown in FIG. 3, Loc_A_1, Loc_B_1, etc. Then, during line balancing, the working station for optical inspection is specified and the testing steps are integrated into the working instructions as well. The mapping of data matrix code and components or models and components, more precisely the information which components and quality characteristics were supposed to be identified in which working station, is given to the manufacturing execution system (MES).

During the manufacturing, the camera captures images according to the inspection programs:

For the first inspection program, the camera outputs which and how many components were found and their quality characteristics, precisely component name, location, and rotation. The output of the camera is then matched by the MES system with data generated during wiring harness development. If deviations are noticed, then failures may be deducted. Failures may be a missing component, a wrong component in a specific location, or a component mounted in wrong geometry.

For the second inspection program, the camera outputs numbers that were detected based on data matrix codes and this information is given to the MES system. The Manufacturing Execution System (MES) system processes this information and derives the quality characteristics. All connectors are mounted correctly if data matrix codes of correct connectors have been identified, data matrix code that are concealed by connectors have not been seen, and that empty connector holder and their data matrix codes are also read by the camera.

If a wrong data matrix code is outputted by the camera, the MES will conclude that connectors are missing, have been mounted in the wrong connector holder, or wrong connectors have been mounted.

The optical inspection is conducted on or after each manual working station. The system, which is the camera in conjunction with a Manufacturing Execution System (MES) that has been provided with the right information and is able to dynamically inspect a high variety of wiring harness configurations.

In case the assembly station or formboard is too big for one image, e.g., due to the technical properties of the camera or lack of space resulting in a short distance between formboard and camera, in another advantageous embodiment, multiple regions of interest for optical inspection may be defined. Accordingly, the formboard is structured into a reasonable number of regions of interest which are specified during the step of designing the map of inspection. The inspection based on dynamic marker change is then conducted for each of the region of interest allowing the quality assessment of big as well as small wiring harness.

The main goal of the proposed method and system is to perform the optical inspection of wiring harness states between individual working stations in the final assembly in an automated way. Proposed solutions with moving cameras cannot be applied here because moving cameras or cameras mounted on robot arms require safety zones in order not to harm the workers in this area.

By using simple industrial cameras, the costs associated with this solution are reduced because no additional hardware is required to move the camera.

Moreover, the solution proposed addresses the optical inspection of a high component variety. The creation of component models with feature engineering and data matrix codes in conjunction with the data flow from wiring harness design over the Manufacturing Execution System MES system to the camera in the field enables the detection of different components in the manufacturing on the formboard dynamically. In contrast, the state of the art, discussed earlier in this document is purely focused on the detection of single components at one moment in time. The effort associated with model and data matrix code creation is comparably low because the models and codes may easily be reused.

Furthermore, the dynamic change of markers allows quick assessment of a component's presence and location in the respective assembly process step. In case of assembly failures, which means that predefined inspection rules at assembly process steps are not fulfilled, the failure becomes evident and may be resolved immediately. Currently, the quality of wiring harnesses is checked at the end of the line and rework is highly time-consuming and laborious.

The proposed automated optical inspection system may be implemented for all rigid and deformable components in the wiring harness industry. Especially in the light of unfolding trends such as autonomous driving and electrification, the monitoring and quality evaluation of safety-critical components is important. As a result, either all components during design may be chosen for modeling and labeling with data matrix codes. Alternatively, chosen components may be included for optical inspection, e.g., safety-critical components with a high ASIL level, quality critical components that required high rework and quality issues in the past should be modeled and labeled.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for inspecting a correct execution of a processing step of a component in a wiring harness, the system comprising:

a processing unit configured to:

execute a first inspection program recognizing the component via an optical sensor by use of at least one marker on the component for identifying a type of the component and identifying a location of the component within the wiring harness; and automatically detect and evaluate dependencies between the type and the location of the component, wherein a definition of dependencies between the type and the location is valid or invalid, wherein a plurality of second markers within an empty space is used for the identifying of the location of the component, wherein the detection and the evaluation of the dependencies is executed before the processing step and after the processing step is executed, and wherein a visibility of one or more second markers of the plurality of second markers by the optical sensor following placement of the component in the wiring harness is indicative of the location of the component being correct of incorrect or indicative of the type of the component being incorrect.

2. The system of claim 1, further comprising:

the optical sensor.

3. A method for inspecting a correct execution of a processing step of a component in a wiring harness, the method comprising:

executing a first inspection program recognizing the component via an optical sensor by use of at least one first marker on the component for identifying a type of the component and identifying a location of the component within the wiring harness; and automatically detecting and evaluating dependencies between the type and the location of the component, wherein a definition of dependencies between the type and the location is valid or invalid, wherein a plurality of second markers within an empty space is used for the identifying of the location of the component, wherein the detecting and the evaluating of the dependencies is executed before the processing step and after the processing step is executed, and wherein a visibility of one or more second markers of the plurality of second markers by the optical sensor following placement of the component in the wiring harness is indicative of the location of the component being incorrect or indicative of the type of the component being incorrect.

4. The method of claim 3, wherein a second inspection program additionally recognizes the component via the optical sensor by identifying distinct features of an appearance of the component, for fully visible components, relying on component modeling, whereas markers are used for partially visible and/or similar components.

5. The method of claim 4, wherein the at least one first marker on the component is used for determining an orientation of the component.

6. The method of claim 5, wherein the at least one first marker on the component comprises a data matrix code applied to the component according to standard ECC 200.

7. The method of claim 6, wherein a list of rules is defined for the dependencies between components, locations, and processing steps, and wherein each rule of the list of rules corresponds with the execution of the processing step and the component and/or one location.

8. The method of claim 7, wherein a Topology Map is defined for indicating technically meaningful locations regarding the execution of the processing step.

9. The method of claim 8, wherein a Map of Inspections is derived from the Topology Map, which is complemented with the list of rules for a visual inspection configured to be executed at the respective location.

10. The method of claim 8, wherein the Topology Map cannot be detected by a single optical sensor, and the inspection is structured into a number of regions of interest.

11. The method of claim 3, wherein the at least one first marker on the component is used for determining an orientation of the component.

12. The method of claim 3, wherein the at least one first marker on the component comprises a data matrix code applied to the component.

13. The method of claim 12, wherein the data matrix code is applied according to standard ECC 200.

14. The method of claim 3, wherein a list of rules is defined for the dependencies between components, locations, and processing steps, and wherein each rule of the list of rules corresponds with the execution of the processing step and the component and/or one location.

15. The method of claim 3, wherein a Topology Map is defined for indicating technically meaningful locations regarding the execution of the processing step.

16. The method of claim 15, wherein a Map of Inspections is derived from the Topology Map, which is complemented with a list of rules for a visual inspection configured to be executed at the respective location.

17. The method of claim 15, wherein the Topology Map cannot be detected by a single optical sensor, and the inspection is structured into a number of regions of interest.

* * * * *